(12) United States Patent
Wei et al.

(10) Patent No.: US 8,668,877 B2
(45) Date of Patent: Mar. 11, 2014

(54) DIESEL OXIDATION CATALYST ARTICLES AND METHODS OF MAKING AND USING

(75) Inventors: Xinyi Wei, Princeton, NJ (US); Stanley A. Roth, Yardley, PA (US)

(73) Assignee: Basf Corporation, Florham Park, NJ (US)

( * ) Notice: Subject to any disclaimer, the term of this patent is extended or adjusted under 35 U.S.C. 154(b) by 283 days.

(21) Appl. No.: 12/954,257

(22) Filed: Nov. 24, 2010

(65) Prior Publication Data

US 2012/0124975 A1    May 24, 2012

(51) Int. Cl.
 *B01D 50/00* (2006.01)
(52) U.S. Cl.
 USPC .......................................................... 422/177
(58) Field of Classification Search
 USPC ................................... 422/177, 180; 502/242
 See application file for complete search history.

(56) References Cited

U.S. PATENT DOCUMENTS

| | | | |
|---|---|---|---|
| 5,177,041 A | 1/1993 | Horiuchi et al. | |
| 6,348,430 B1 * | 2/2002 | Lindner et al. | 502/304 |
| 2007/0224093 A1 | 9/2007 | Miyairi et al. | |
| 2010/0166629 A1 * | 7/2010 | Deeba | 423/213.5 |
| 2010/0180582 A1 | 7/2010 | Mueller-Stach et al. | |
| 2010/0183490 A1 | 7/2010 | Hoke et al. | |
| 2010/0190634 A1 * | 7/2010 | Sato et al. | 502/65 |
| 2010/0257843 A1 | 10/2010 | Hoke et al. | |

FOREIGN PATENT DOCUMENTS

| | | |
|---|---|---|
| EP | 0622107 A2 | 11/1994 |
| JP | 2003-062465 | 3/2003 |
| JP | 2006-007117 | 1/2006 |

\* cited by examiner

*Primary Examiner* — Tom Duong
(74) *Attorney, Agent, or Firm* — Melanie L. Brown

(57) ABSTRACT

Diesel oxidation catalysts, catalytic articles, methods of making catalytic articles, emissions treatment systems and methods of treating an exhaust gas stream using the catalytic articles for the treatment of exhaust gas emissions, such as the oxidation of unburned hydrocarbons (HC) and carbon monoxide (CO) are described. Specific catalytic articles comprising a substrate with a first washcoat layer comprising greater than or equal to about 2% by weight palladium dispersed on a ceria support and a second washcoat layer comprising a platinum group metal and a refractory metal oxide are described.

13 Claims, 8 Drawing Sheets

DIESEL OXIDATION CATALYST ARTICLES AND METHODS OF MAKING AND USING

BACKGROUND

Embodiments of the present invention are directed to diesel oxidation catalysts and methods of making thereof.

Operation of lean burn engines, e.g., diesel engines and lean burn gasoline engines; provide the user with excellent fuel economy and have very low emissions of gas phase hydrocarbons and carbon monoxide due to their operation at high air/fuel ratios under fuel lean conditions. Diesel engines; in particular, also offer significant advantages over gasoline engines in terms of their fuel economy, durability and their ability to generate high torque at low speed.

From the standpoint of emissions, however, diesel engines present problems more severe than their spark-ignition counterparts. Emission problems relate to particulate matter (PM), nitrogen oxides (NOx), unburned hydrocarbons (HC) and carbon monoxide (CO). NOx is a term used to describe various chemical species of nitrogen oxides, including nitrogen monoxide (NO) and nitrogen dioxide ($NO_2$), among others. NO is of concern because it is believed to undergo a process known as photo-chemical smog formation, through a series of reactions in the presence of sunlight and hydrocarbons, and is significant contributor to acid rain. $NO_2$ on the other hand has a high potential as an oxidant and is a strong lung irritant. Particulates (PM) are also connected to respiratory problems. As engine operation modifications are made to reduce particulates and unburned hydrocarbons on diesel engines, the NOx emissions tend to increase.

Oxidation catalysts comprising a precious metal dispersed on a refractory metal oxide support are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), or more simply catalytic converters, which are placed in the exhaust flow path from a diesel-powered engine to treat the exhaust before it vents to the atmosphere. Typically, the diesel oxidation catalysts are formed on ceramic or metallic substrate carriers (such as the flow-through monolith carrier, as described below) upon which one or more catalyst coating compositions are deposited. In addition to the conversion of gaseous HC, CO and the SOF fraction of particulate matter, oxidation catalysts that contain platinum group metals (which are typically dispersed on a refractory oxide support) promote the oxidation of nitric oxide (NO) to $NO_2$.

Catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, an adsorbent material, which may be a zeolite, may be provided as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature.

As discussed above, oxidation catalysts comprising a platinum group metal dispersed on a refractory metal oxide support are known for use in treating exhaust gas emissions from diesel engines. Platinum (Pt) remains the most effective platinum group metal for oxidizing CO and HC in a DOC, after high temperature aging under lean conditions and in the presence of fuel sulfur. Nevertheless, Pd-incorporated catalysts offer advantages in stabilizing Pt at higher temperature aging (>700° C.) and lowering catalyst cost. However, Pd based DOCs typically show higher light-off temperatures for oxidation of CO and HC, especially when used with HC storage materials, potentially causing a delay in HC and or CO light-off. Pd containing DOCs may poison the activity of Pt to convert paraffins and/or oxidize NO and may also make the catalyst more susceptible to sulfur poisoning. These characteristics have typically prevented the use of Pd as an oxidation catalyst in lean burn operations especially for light duty diesel applications where engine temperatures remain below 250° C. for most driving conditions, It would be desirable to improve upon one or more of the aforementioned limitations.

SUMMARY

One or more embodiments of the invention are directed to catalytic articles for treating an exhaust gas stream containing hydrocarbons, CO and particulate matter. The articles comprise a substrate having an inlet end and an outlet end defining an axial length. A first washcoat layer on the substrate comprises greater than or equal to about 2% by weight palladium dispersed on a ceria support. A second washcoat layer on the first washcoat layer. The second washcoat layer comprises a platinum group metal and a refractory metal oxide.

Additional embodiments of the invention are directed to emissions treatment systems comprising a diesel engine emitting an exhaust stream including hydrocarbons, CO and particulate matter. The catalytic article comprising a substrate with a first washcoat layer and a second washcoat layer is downstream of and in flow communication with the diesel engine. The first washcoat layer on the substrate comprises greater than or equal to about 2% by weight palladium dispersed on a ceria support. The second washcoat layer is on the first washcoat layer. The second washcoat layer comprises a platinum group metal and a refractory metal oxide.

Further embodiments of the invention are directed to methods of making a catalytic article, A substrate surface is coated with a first washcoat layer comprising palladium supported on ceria. The palladium has a loading of greater than or equal to about 2% by weight. The substrate is dried and calcined and then coated with a second washcoat layer comprising a platinum group metal and a refractory metal oxide. The substrate is then dried and calcined again.

In detailed embodiments, the first washcoat layer comprises palladium in the range of about 2% to about 10% by weight. In specific embodiments, the first washcoat layer comprises about 4% palladium by weight. In some embodiments, the first washcoat layer comprises substantially no alumina. In one or more embodiments, the first washcoat comprises substantially no dopants. In detailed embodiments, the refractory metal oxide in the second washcoat layer comprises alumina.

In detailed embodiments, the platinum group metal in the second washcoat layer comprises one or more of platinum and palladium supported on the refractory metal oxide. In specific embodiments, the platinum group metal in the second washcoat layer is present in the range of about 1% to about 5% by weight. In some embodiments, the second washcoat layer further comprises a zeolite. In detailed embodiments, the zeolite comprises one or more of beta-zeolite, Y-zeolite and ZSM-5.

The substrate of specific embodiments is a flow-through substrate having a plurality of longitudinally extending passages formed by longitudinally extending walls bounding and defining said passages. In one or more embodiments, the substrate is a wall-flow filter having gas permeable walls formed into a plurality of axially extending channels, each channel having one end plugged with any pair of adjacent channels plugged at opposite ends thereof.

DETAILED DESCRIPTION

Figure 1:
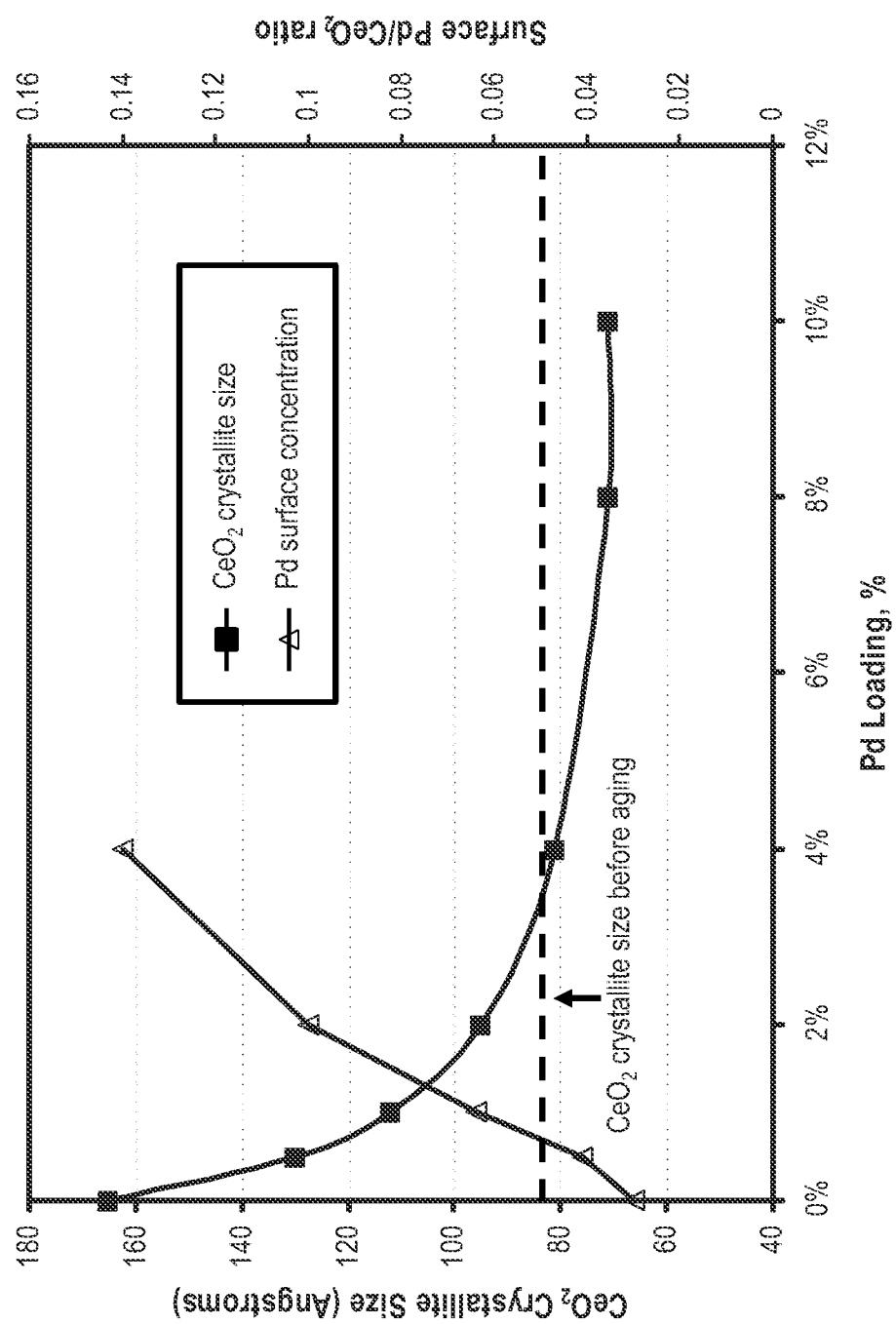
FIG. 1 is a graph of the ceria crystallite size and the surface ratio of Pd to ceria as a function of the Pd loading in accordance with one or more embodiments of the invention.

Before describing several exemplary embodiments of the invention, it is to be understood that the invention is not limited to the details of construction or process steps set forth in the following description. The invention is capable of other embodiments and of being practiced or being carried out in various ways.

Where they appear herein, the terms "exhaust stream" and "engine exhaust stream" refer to the engine out effluent as well as to the effluent downstream of one or more other catalyst system components including but not limited to a diesel oxidation catalyst and/or soot filter.

The following terms shall have, for the purposes of this application, the respective meanings set forth below.

"Refractory metal oxides" refer to alumina, silica, zirconia, titania, cede, and physical mixtures or chemical combinations thereof, including atomically doped combinations.

"Platinum group metal components" refer to platinum group metals in the Periodic Table of Elements or one of their oxides.

"Rare earth metal components" refer to one or more oxides of the lanthanum series defined in the Periodic Table of Elements, including lanthanum, cerium, praseodymium and neodymium.

"Flow communication" means that the components and/or conduits are adjoined such that exhaust gases or other fluids can flow between the components and/or conduits.

"Downstream" refers to a position of a component in an exhaust gas stream in a path further away from the engine than the component preceding component. For example, when a diesel particulate filter is referred to as downstream from a diesel oxidation catalyst, exhaust gas emanating from the engine in an exhaust conduit flows through the diesel oxidation catalyst before flowing through the diesel particulate filter. Thus, "upstream" refers to a component that is located closer to the engine relate to another component.

An aspect of the invention pertains to a catalyst. According to one or more embodiments, the catalyst may be disposed on a monolithic substrate as a washcoat layer. "Washcoat" has its usual meaning in the art of a thin, adherent coating of a catalytic or other material applied to a refractory substrate, such as a honeycomb flow through monolith substrate or a filter substrate, which is sufficiently porous to permit the passage there through of the gas stream being treated. As used herein and as described in Ronald M.Heck and Robert J. Farrauto, *Catalytic Air Pollution Control*, New York: Wiley-Interscience, 2002, pp. 18-19, a washcoat layer includes a compositionally distinct layer of material disposed on the surface of the monolithic substrate or an underlying washcoat layer. A catalyst can contain one or more washcoat layers, and each washcoat layer can have unique chemical catalytic functions.

A major function of diesel oxidation catalysts (DOC) is to convert carbon monoxide and hydrocarbons at relatively low temperature, particularly during engine cold start. Incorporating palladium with an oxygen storage component (OSC) into the DOC has been shown to significantly improve the CO/HC light-off activity. Embodiments of the invention describe superior low temperature activity of a pure ceria supported, high palladium concentration catalyst and its significant improvement of other palladium-OSC catalysts. The high palladium-ceria catalyst can be used alone or as a separate layer of a fully formulated catalyst to enhance the low temperature performance.

A pure ceria support is less stable than zirconia or other rare earth doped ceria upon hydrothermal aging at higher temperature (>700°). As a result, after such aging, P—$CeO_2$ at relatively low Pd loading (<1%) shows much inferior activity than Pd—OSC for CO/HC oxidation. However, the inventors have discovered that when the Pd concentration is increased to greater than or equal to about 3% by weight a dramatic mutual stabilization effect starts to occur which result in extremely high CO/HC light-off activity, and the activity improves even upon hydrothermal aging.

Without being bound by any particular theory of operation, it is believed that the high activity probably comes from a combination of several factors: (1) nearly atomic dispersion of Pd on the $CeO_2$ surface and readily available $Pd^0$; (2) strong stabilization of $CeO_2$ crystallite by Pd (At >4% loading) from sintering at higher temperature; and (3) activation by steam which is unique to Pd—OSC component and is enhanced by the Pd—$CeO_2$ synergy. Evidence for strong Pd—$CeO_2$ synergy is demonstrated in FIG. 1. The $CeO_2$ crystallite size and surface Pd concentration as a function of Pd loading on $CeO_2$ were measured on samples that were aged at 750° C./20 h in 10% steam air. The systematic decrease in $CeO_2$ crystallite size and increase in surface Pd/$CeO_2$ with increasing Pd loading suggests a mutual stabilization effect between $CeO_2$ and Pd upon hydrothermal aging. On the other hand, such behavior is not observed on any doped-$CeO_2$ supported Pd catalysts, i.e. surface Pd concentration does not increase with increasing Pd loading. Differently from zirconia-supported Pd catalysts, Pd—$CeO_2$ catalyst appears stable under light-off conditions and does not suffer from run-to-run deactivations, An advantage of 3-8% Pd—$CeO_2$ to PdlOSC remained after engine aging, a 24° C. improvement in CO light-off was observed. The high activity of 3-8% Pd—$CeO_2$ catalyst decreases dramatically when other dopants, such as zirconium or lanthanum are present. It is believed that this is due to the loss of Pd—$CeO_2$ interaction which may be important for low temperature activity.

The high Pd—$CeO_2$ component can be employed in a separate layer from the Pt—Pd/$Al_2O_3$ component to avoid the negative interaction between Pt and $CeO_2$. In specific embodiments, the Pd—$CeO_2$ is located beneath the Pt—Pd/$Al_2O_3$ layer, so that the HC species, which could inhibit the Pd—$CeO_2$ function, can be oxidized and removed before reaching the Pd—$CeO_2$.

Figure 2:
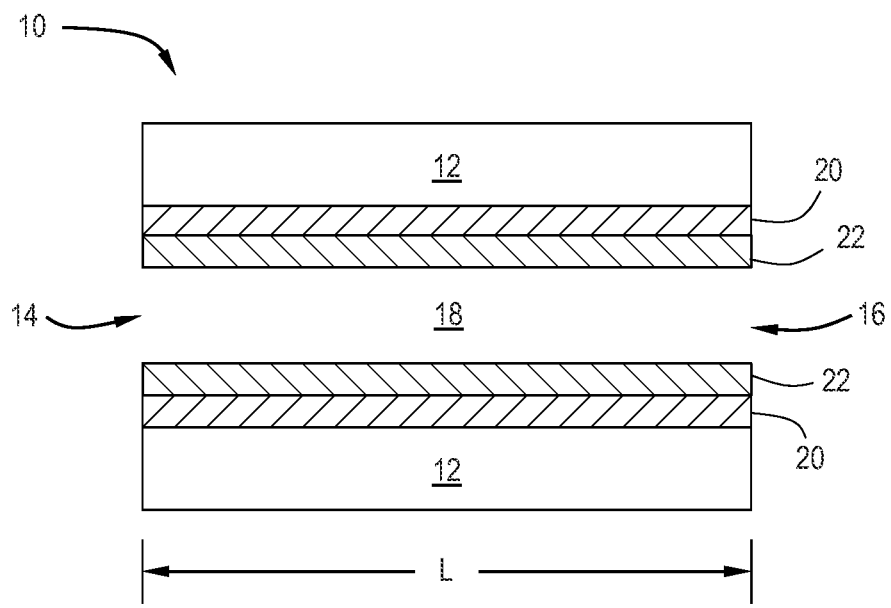
FIG. 2 is a schematic view of a channel a catalytic article in accordance with one or more embodiments of the invention.

Accordingly, one or more embodiments of the invention pertain to catalytic articles for treating an exhaust gas stream containing hydrocarbons, CO and particulate matter. With reference to FIG. 2, a catalytic article 10 may comprise a substrate 12 having an inlet end 14 and an outlet end 16 defining an axial length L. A single channel 18 of the substrate 12 is shown. A first washcoat layer 20 is on the substrate 12. The first washcoat layer 20 comprises greater than or equal to about 3% by weight palladium dispersed on a ceria support. A second washcoat layer 22 is on the first washcoat layer 20. The second washcoat layer 22 comprises a platinum group metal and a refractory metal oxide. The amount of palladium in the first washcoat layer 20 can vary depending on the desired application and specific uses. In one or more embodiments, the first washcoat layer 20 comprises palladium in the range of about 2% to about 10% by weight. In some embodiments, the first washcoat layer 20 comprises palladium in the range of about 3% to about 6% by weight, In various embodiments, the first washcoat layer comprises about 2%, 3%, 4%, 5%, 6%, 7%, 8%, 9% or 10% palladium by weight, In specific embodiments, the first washcoat layer 20 comprises about 4% palladium by weight. In various embodiments, the first washcoat layer 20 comprises palladium in an amount greater than about 2%, 4%, 5%, 6%, 7%, 8%, 9% or 10% by weight.

In specific embodiments, the first washcoat layer 20 comprises substantially no alumina. As used in this specification and the appended claims, the term "substantially no alumina" means that alumina has not been intentionally added to the first washcoat layer. It should be understood that alumina may migrate from layers above or below the first washcoat layer 20 without deviating from the meaning of substantially no alumina.

As has been previously described, the activity of high % Pd—$CeO_2$ catalyst can decrease when other dopants are present. In detailed embodiments, the first washcoat layer 20 comprises substantially no dopants. According to specific embodiments, the first washcoat layer 20 comprises substantially no dopants, individually or in combination, such as zirconium, lanthanum, praseodymium, samarium, neodymium, yttrium, titanium and/or silicon.

In one or more embodiments, the second washcoat layer 22 composition differs from that of the first washcoat layer 20. For example, in some embodiments, the second washcoat layer 22 has a refractory metal oxide comprising alumina. In these embodiments, it is expected that a small portion of the alumina will migrate into the first washcoat layer 20.

The platinum group metal in the second washcoat layer 22 of detailed embodiments comprises one or more of platinum and palladium supported on the refractory metal oxide. In specific embodiments, the platinum group metal of the second washcoat layer 22 is platinum and palladium.

The refractory metal oxide of the second washcoat layer 22 can be any suitable material known to those skilled in the art. In specific embodiments, the refractory metal oxide of the second washcoat layer 22 comprises alumina.

The amount of the platinum group metal in the second washcoat layer 22 can be varied depending on the desired characteristics of the resultant catalytic article. In detailed embodiments, the platinum group metal in the second washcoat layer 22 is present in the range of about 1% to about 5% by weight.

The second washcoat layer 22 of detailed embodiments further comprises a zeolite. Any suitable zeolite can be added and are known to those skilled in the art. In specific embodiments, the zeolite comprises one or more of beta-zeolite, Y-zeolite and ZSM-5.

The Substrate

Any suitable substrate may be employed, such as a monolithic flow-through substrate and having a plurality of fine, parallel gas flow passages extending from an inlet to an outlet face of the substrate, such that passages are open to fluid flow. The passages, which are essentially straight paths from their fluid inlet to their fluid outlet, are defined by walls on which the catalytic material is coated as a "washcoat" so that the gases flowing through the passages contact the catalytic material. The flow passages of the monolithic substrate are thin-walled channels which can be of any suitable cross-sectional shape such as is trapezoidal, rectangular, square, sinusoidal, hexagonal, oval, circular, etc. Such structures may contain from about 60 to about 1200 or more gas inlet openings (i.e., "cells") per square inch of cross section (cpsi). However, it will be understood that the invention is not limited to a particular substrate type, material, or geometry.

Ceramic substrates may be made of any suitable or ceramic or metallic material. Exemplary ceramic materials include but are not limited to: cordierite, cordierite-a alumina, silicon nitride, zircon mullite, spodumene, alumina-silica magnesia, zircon silicate, sillimanite, magnesium silicates, zircon, petalite, alumina, aluminosilicates and the like. Exemplary metallic supports include the heat resistant metals and metal alloys such as titanium and stainless steel as well as other alloys in which iron is a substantial or major component.

Figure 3:
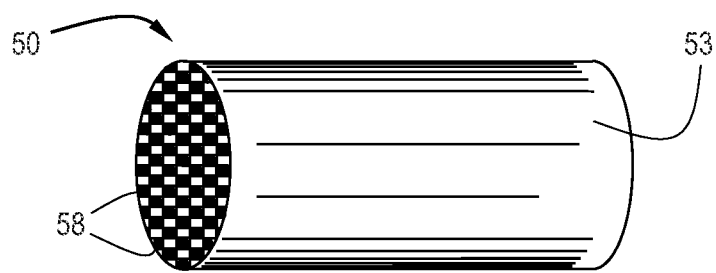
FIG. 3 is a perspective view of a wall flow monolith in accordance with one or more embodiments of the invention.
Figure 4:
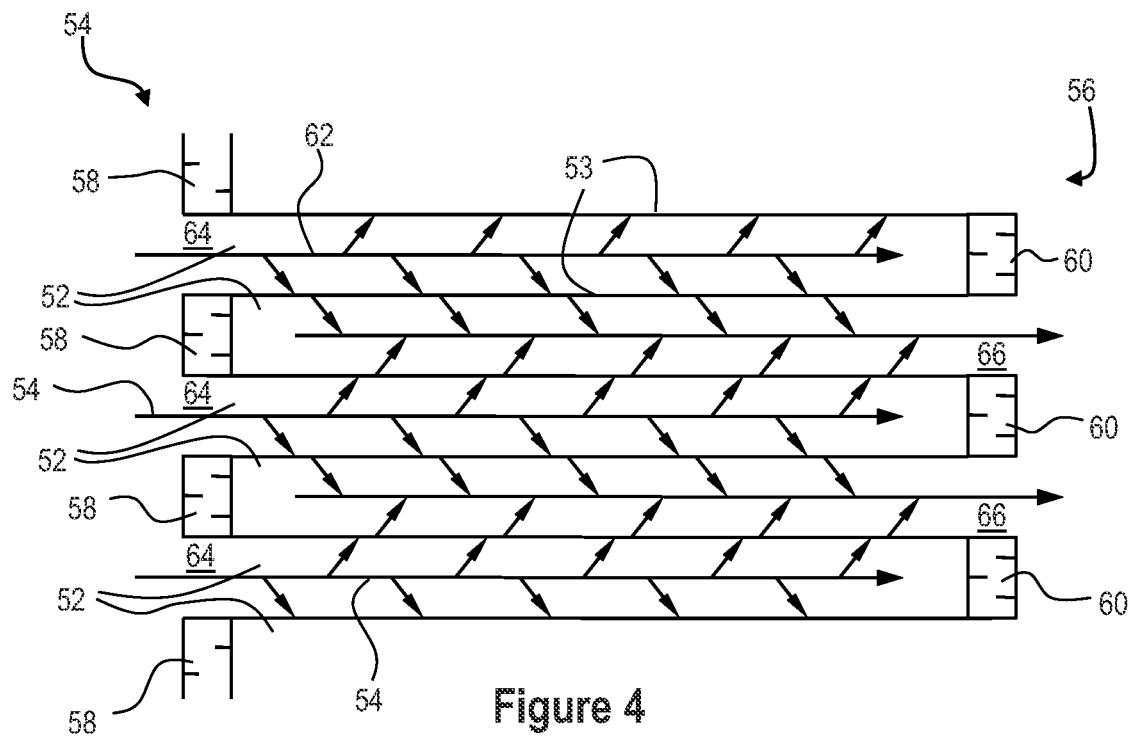
FIG. 4 is a partial cross-sectional view of a wall flow monolith for use with one or more embodiments of the invention.

FIGS. 3 and 4 illustrate a wall flow filter substrate 50 which has a plurality of alternately blocked channels 52 and can serve as a particulate filter. The passages are tabularly enclosed by the internal walls 53 of the filter substrate. The plurality of axially extending channels are formed from gas permeable internal walls 53. The substrate has an inlet end 54 and an outlet end 56. Alternate passages are plugged at the inlet end 54 with net plugs 58 and at the outlet end 56 with outlet plugs 60 to form opposing checkerboard patterns at the inlet 54 and outlet 56. Thus, each channel 52 has one end plugged with any pair of adjacent channels plugged at opposite ends thereof. A gas stream enters through the unplugged channel inlet 64, is stopped by outlet plug 60 and diffuses through channel walls 53 (which are porous) to the outlet end 56. The gas cannot pass back to the net side of walls because of net plugs 58. If such substrate is utilized, the resulting system will be able to remove particulate matters along with gaseous pollutants.

Figure 5:
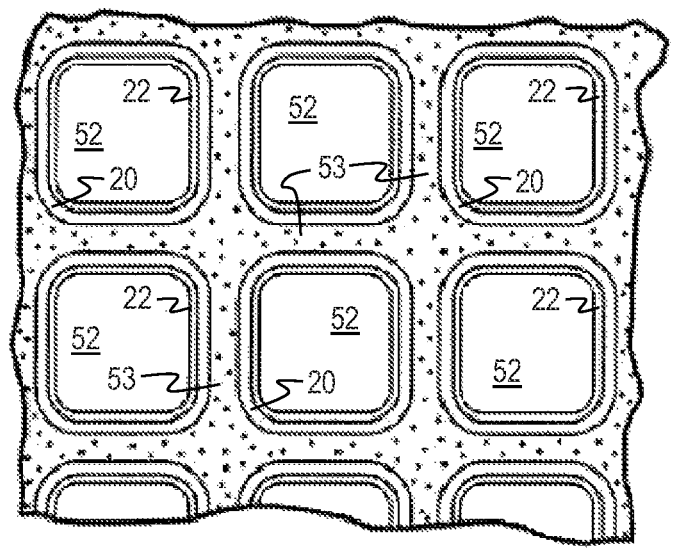
FIG. 5 is a partial cross-sectional view enlarged relative to FIG. 3 and taken along a plane parallel to the end faces of the monolith of FIG. 4, which shows an enlarged view of the gas flow passages shown in FIG. 4.

FIG. 5 shows a partial cross-sectional view of the wall flow filter in FIGS. 2 and 3. The cross-sectional view is shown along a plane parallel to the end of the substrate 50. It can be seen from FIG. 5 that the flow passages, or channels 52, are formed by the internal walls 53 and extend through the substrate 50 from the net end 54 to the outlet end 56. The net plugs 58 and outlet plugs 60 are not shown. The walls 53 are so dimensioned and configured that gas flow channels 52 have a substantially regular polygonal shape, substantially square in the illustrated embodiment; but with rounded corners in accordance with U.S. Pat. No. 4,335,023, issued Jun. 15, 1982 to J. C. Dettling et al. The first washcoat layer 20, which in the art and sometimes herein is referred to as a "washcoat", is adhered or coated onto the walls 53 of the substrate 12. The second washcoat layer 22 is coated over the first washcoat layer 20 as described herein. In some embodiments, an undercoat (not shown) can be applied to the substrate 12 beneath the first washcoat layer 20.

As shown in FIG. 5, the carrier member include void spaces provided by the gas-flow channels 52, and the cross-sectional area of channels 52 and the thickness of the walls 53 defining the channels 52 will vary from one type of carrier member to another. Similarly, the weight of washcoat applied to such carriers will vary from case to case. Consequently, in describing the quantity of washcoat or catalytic metal component or other component of the composition, it is convenient to use units of weight of component per unit volume of catalyst carrier. Therefore, the units grams per cubic inch ("g/in$^3$") and grams per cubic foot ("g/ft$^3$") are used herein to mean the weight of a component per volume of the carrier member, including the volume of void spaces of the carrier member.

When the composition is disposed on a refractory oxide substrate, e.g., a flow through honeycomb substrate, the concentration of platinum group metal is typically from about 10 to 200 g/ft$^3$, 30 to 150 g/ft$^3$, or even 50 to 120 g/ft$^3$.

Method of Preparing a Catalyst

Figure 6:
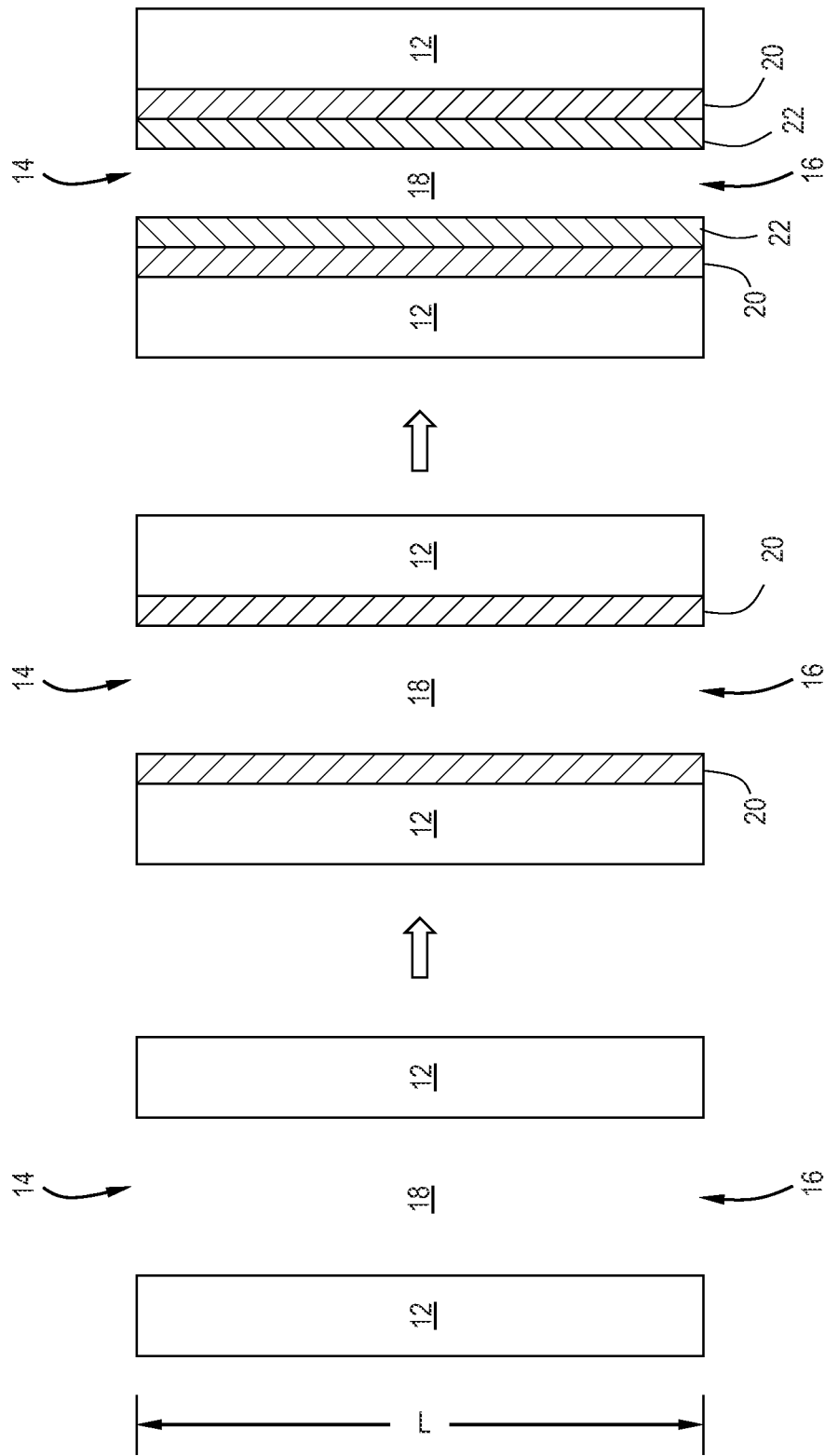
FIG. 6 shows a schematic view of the preparation of a catalytic article according to one or more embodiments of the invention.

With reference to FIG. 6, one or more embodiments of the invention are directed to methods of making a catalytic article. A substrate 12 surface is coated with a first washcoat layer 20 comprising palladium supported on cella. The substrate 12 having an inlet end 14 and an outlet end 16 defining an axial length L. A single channel 18 of the substrate 12 is shown for illustrative purposes. It should be understood that the substrate 12 may comprise a plurality of channels. In detailed embodiments, the substrate 12 has a plurality of channels 18 formed by axially extending gas permeable walls. The palladium has a loading of greater than or equal to about 2% by weight. The coated substrate 12 is then dried and calcined to fix the first washcoat layer 20 onto the substrate 12. Some embodiments of the first washcoat layer 20 have been described herein.

The coated substrate 12 is then coated with a second washcoat layer 22. The second washcoat layer 22 comprises a platinum group metal and a refractory metal oxide. The coated substrate 12 is then dried and calcined again to fix the second washcoat layer 22 onto the substrate 12. Some embodiments of the second washcoat layer 22 have been described herein.

Emissions Treatment System

Figure 7:
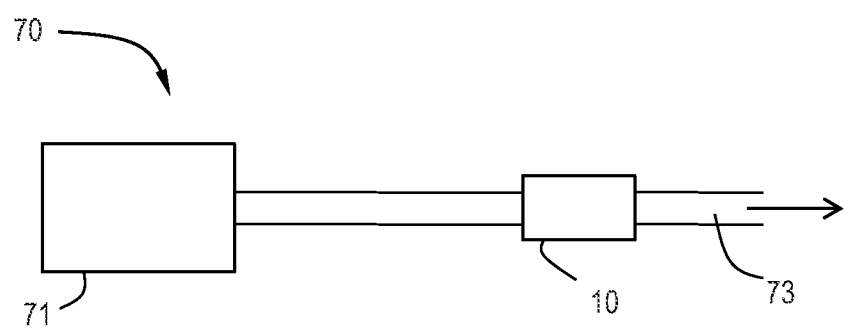
FIG. 7 shows an emissions treatment system in accordance with one or more embodiments of the invention.

With reference to FIG. 7, additional embodiments of the invention are directed to emissions treatment systems 70. One or more embodiments of the system 70 comprise a diesel engine 71 emitting an exhaust stream including hydrocarbons, CO and particulate matter. A diesel oxidation catalytic article 10, as described throughout, is positioned downstream of and in flow communication with the diesel engine 71. The catalytic article 10 has an inlet end and an outlet end defining an axial length. The exhaust gas stream exiting the diesel engine 71 passes through the catalytic article 10 where the NOx, CO and hydrocarbons are oxidized. The exhaust stream exiting the catalytic article 10 can then exit the treatment system 70 through, for example, the tailpipe 73 and be expelled to the atmosphere.

EXAMPLES

Example 1

A series of Pd loaded $CeO_2$, CSC (45% $CeO_2$-55% $ZrO_2$), or $ZrO_2$ samples at different Pd concentrations were prepared by incipient wetness impregnation of support materials with a $Pd(NH_3)_4(NO_3)_2$ solution. The samples were dried at 110° C. and calcined at 450° C. in air. After hydrothermal aging at 750° C. for 20 hours, the samples were evaluated for CO and HC light-off activity on a lab reactor. The light-off gas mixture consisted of 2000 ppm CO, 100 ppm $C_3H_6$, 100 ppm $C_3H_8$, 50 ppm Toluene, 100 ppm NO, 12% $O_2$ and 5% $H_2O$.

Figure 8:
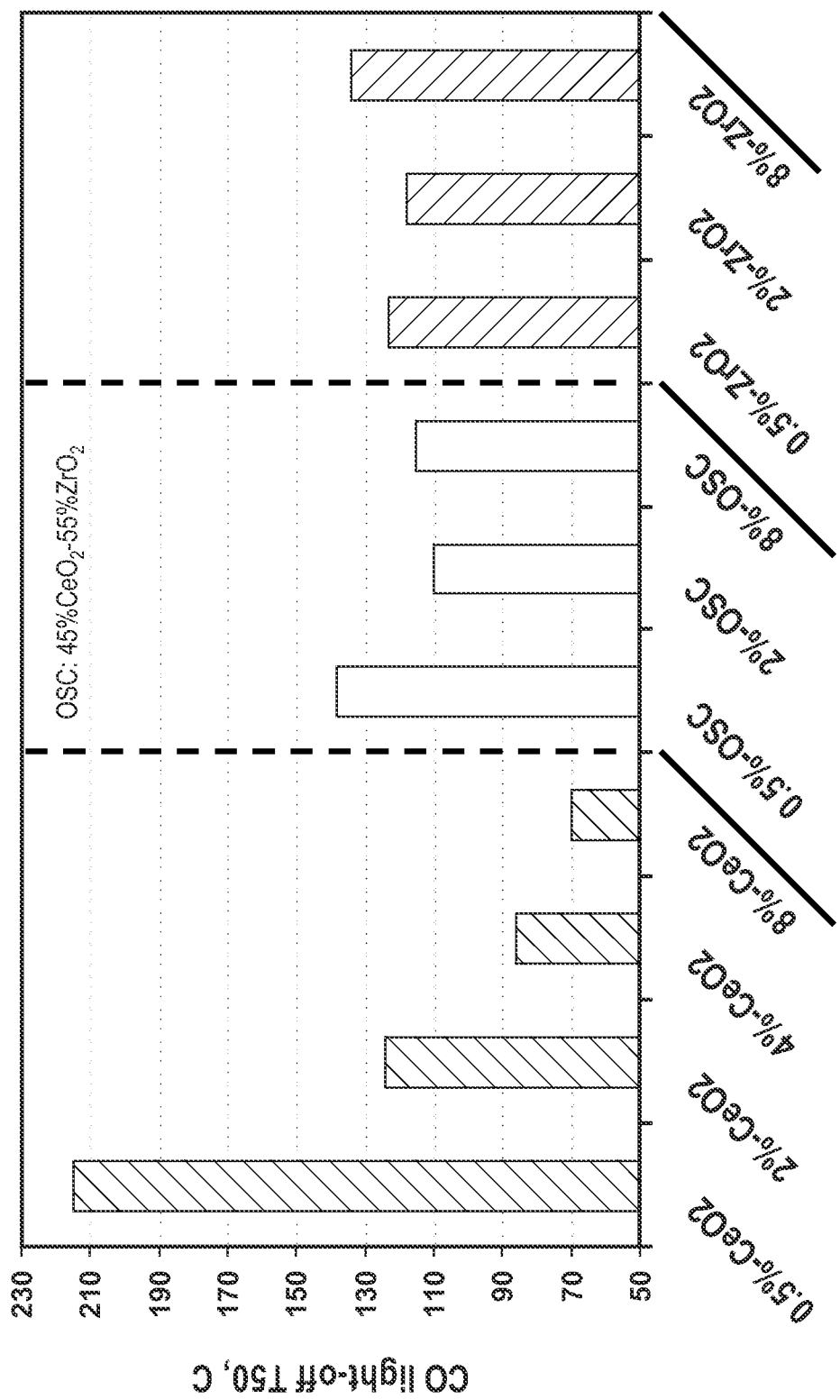
FIG. 8 is a graph of the carbon monoxide light off tempera u e for catalysts in accordance with embodiments of the invention.

FIG. 8 shows $T_{50}$, i.e. the temperature at which 50% conversion is achieved (lower $T_{50}$≈higher activity) for the various samples. Although 0.5% Pd/$CeO_2$ sample showed the highest $T_{50}$ (215° C.), the activity of the Pd/$CeO_2$ series increases drastically with Pd loading, and the highest activity is observed when Pd % is ≥4% (≤86° C.). This observation was consistent with the Pd—$CeO_2$ synergy demonstrated in FIG. 1. On the other hand, on the OSC (45% $CeO_2$-55% $ZrO_2$) or $ZrO_2$ supports, the CO light-off $T_{50}$ (110-130° C.) did not respond to Pd loading and appeared much higher than the 4-8% Pd/$CeO_2$ samples at equivalent Pd loading.

Example 2

A series of 2-4% Pd loaded $CeO_2$ and CSC (45% $CeO_2$-55% $ZrO_2$) samples were prepared by incipient wetness impregnation of support materials with $Pd(NH_3)_4(NO_3)_2$ solution. The samples were dried at 110° C. and calcined at 450° C. in air. Each powder sample was made into a slurry and milled to particle size $D_{80}$<12 μm, it was then mixed with a pre-milled γ-alumina slurry at 50:50 dry gain ratio, then coated onto a flow through monolith substrate. The γ-alumina served as a binder material for better washcoat adhesion. The total washcoat was 1.5 g/in$^3$, and Pd loading was 26 g/ft$^3$ for 2% Pd/support or 52 g/ft$^3$ for 4% Pd/support respectively.

The 5% Y—$CeO_2$ support was prepared by impregnating $Y(NO_3)_3$ solution onto $CeO_2$ followed with drying and calcination. A reference Pt—Pd/$Al_2O_3$ catalyst at 70 g/ft$^3$ PGM loading and 2/1 Pt/Pd ratio was also prepared for comparison. In this case, the Pt and Pd precursor solutions were co-impregnated onto the alumina support followed with drying and calcination. The subsequent slurry and coating procedures were similar to those of Pd/$CeO_2$ catalysts. The coated catalysts were aged on a diesel engine at 750° C. for 20 hours, and measured for CO/HC light-off activities on a lab reactor. The light-off gas mixture consisted of 1400 ppm CO, 100 ppm $C_3H_6$, 50 ppm toluene, 100 ppm NO, 5% $CO_2$, 10% $O_2$ and 7% $H_2O$. The space velocity was 50,000 h$^{-1}$.

Figure 9:
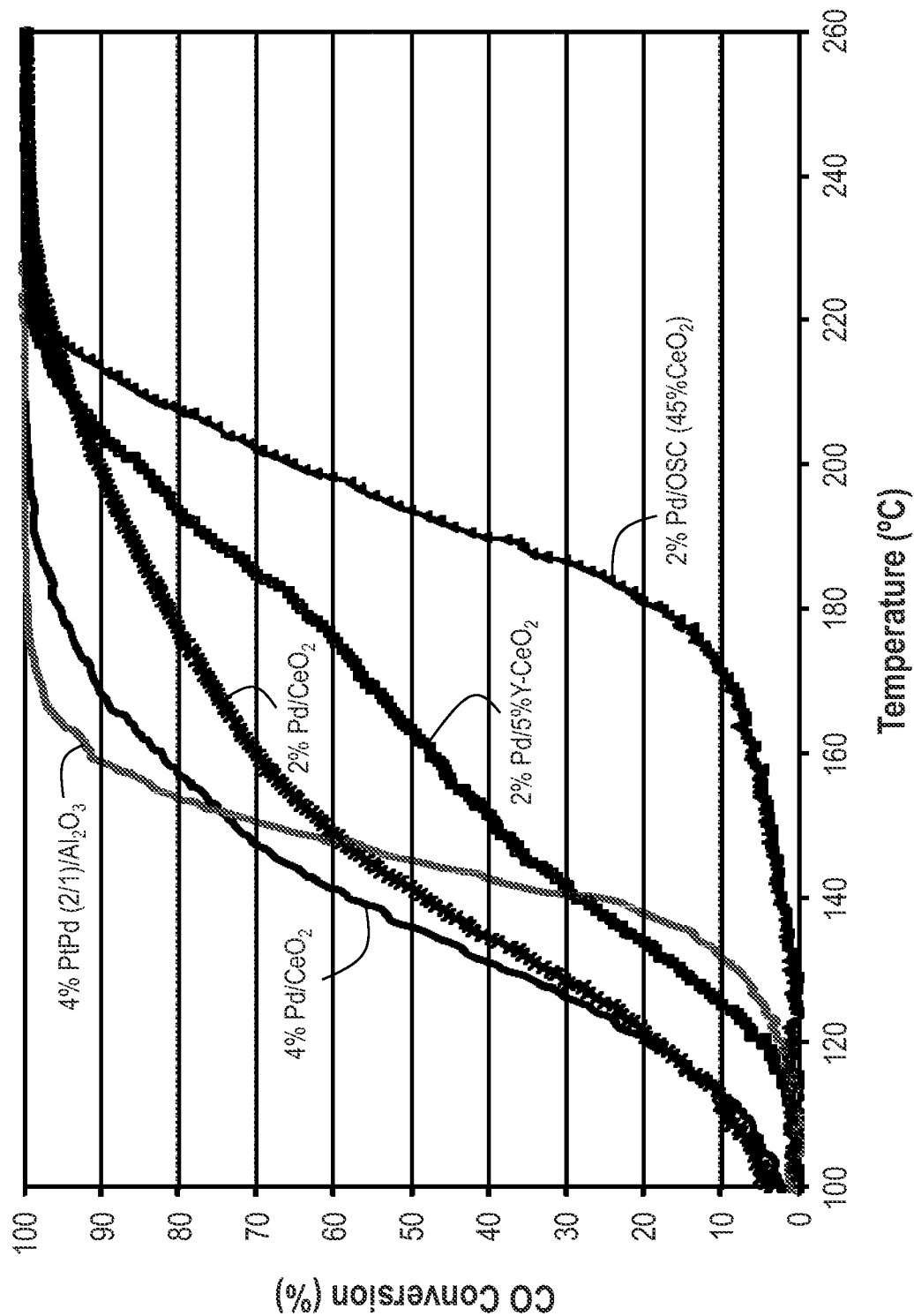
FIG. 9 is a graph of the carbon monoxide conversion for various catalysts in accordance with embodiments of the invention.

FIG. 9 shows a comparison of the CO light-off data. Compared to the 2% Pd/OSC catalyst, the 2% Pd/$CeO_2$ catalyst showed >50° C. improvement in $T_{50}$, the 4% Pd/$CeO_2$ showed further improvement than the 2% Pd/$CeO_2$ catalyst, particularly in the higher temperature region (i.e. $T_{80}$). The CO $T_{50}$ of 2% Pd/$CeO_2$ increased by ~20° C. when 5% Y was introduced to $CeO_2$. Similar decay in activity was observed when other elements such as Zr or La were introduced. Compared to the Pt—Pd/$Al_2O_3$ reference catalyst at much higher PGM loading, the 2-4% Pd/$CeO_2$ catalysts also showed higher activity at lower temperature region up to 140° C., confirming the advantages of high Pd/$CeO_2$ component for low temperature CO/HC conversion, which could significantly benefit the emission abatement during cold start.

Example 3

Figure 10:
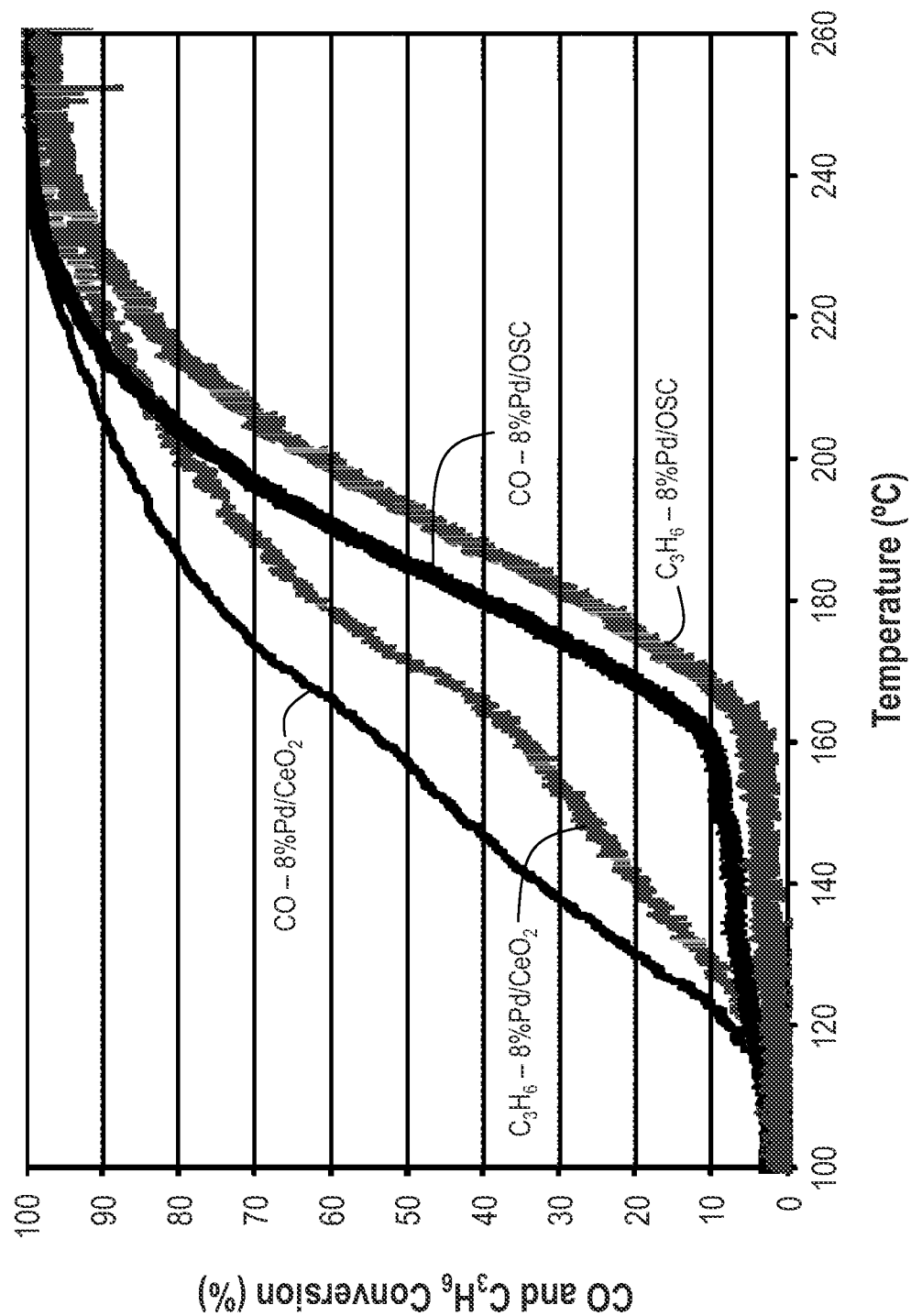
FIG. 10 is a graph of the carbon monoxide and propane conversions for various catalysts in accordance with embodiments of the invention.

Layered catalysts were prepared by using 2-6% Pd/$CeO_2$ in the bottom layer and PtPd/$Al_2O_3$+β-zeolite in the top layer. Given fixed PGM loading and ratio, the PGM distribution in the bottom and top layers was adjusted to achieve maximal overall activity. As described Example 2, 2-6% Pd/$CeO_2$ in the bottom layer made greater contribution during cold-start emission, whereas the Pt—Pd/Al$_2$O$_3$ component in the top layer was more effective for emission conversion at higher temperatures. Zeolites were separated from the Pd/CeO$_2$ component at all times to avoid negative impact on Pd. In the examples, the catalyst consisted of 8% Pd/CeO$_2$ or 8% Pd/OSC (45% CeO$_2$-55% ZrO$_2$) in the bottom layer (washcoat loading was 1 g/in$^3$, Pd loading was 138 g/ft), and Pt/Al$_2$O$_3$+β-zeolite in the top layer (washcoat loading was 0.75 g/in3, Pt loading was 8g/ft$^3$). The catalysts were aged and tested under the same condition as in Example 2. The CO and C$_3$H$_6$ light-off data are shown in FIG. 10. The catalyst with the 8% Pd/CeO$_2$ bottom coat showed 20-30° C. lower $T_{50}$.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The order of description of the above method should not be considered limiting, and methods may use the described operations out of order or with omissions or additions.

It is to be understood that the above description is intended to be illustrative, and not restrictive. Many other embodiments will be apparent to those of ordinary skill in the art upon reviewing the above description. The scope of the invention should, therefore, be determined with reference to the appended claims, along with the full scope of equivalents to which such claims are entitled.

What is claimed is:

1. A catalytic article for treating an exhaust gas stream containing hydrocarbons, CO and particulate matter, the article comprising:
    a substrate having an inlet end and an outlet end defining an axial length;
    a first washcoat layer on the substrate comprising greater than or equal to about 2% by weight palladium dispersed on a pure ceria support; and
    a second washcoat layer on the first washcoat layer, the second washcoat layer comprising a platinum group metal and a refractory metal oxide.

2. The catalytic article of claim 1, wherein the first washcoat layer comprises palladium in the range of about 2% to about 10% by weight.

3. The catalytic article of claim 1, wherein the first washcoat layer comprises about 4% palladium by weight.

4. The catalytic article of claim 1, wherein the first washcoat layer comprises substantially no alumina.

5. The catalytic article of claim 1, wherein the first washcoat comprises substantially no dopants.

6. The catalytic article of claim 1, wherein the refractory metal oxide in the second washcoat layer comprises alumina.

7. The catalytic article of claim 1, wherein the platinum group metal in the second washcoat layer comprises one or more of platinum and palladium supported on the refractory metal oxide.

8. The catalytic article of claim 1, wherein the platinum group metal in the second washcoat layer is present in the range of about 1% to about 5% by weight.

9. The catalytic article of claim 1, wherein the second washcoat layer further comprises a zeolite.

10. The catalytic article of claim 9, wherein the zeolite comprises one or more of beta-zeolite, Y-zeolite and ZSM-5.

11. The catalytic article of claim 1, wherein the substrate is a flow-through substrate having a plurality of longitudinally extending passages formed by longitudinally extending walls bounding and defining said passages.

12. The catalytic article of claim 1, wherein the substrate is a wall-flow filter having gas permeable was formed into a plurality of axially extending channels, each channel having one end plugged with any pair of adjacent channels plugged at opposite ends thereof.

13. An emissions treatment system comprising:
    a diesel engine emitting an exhaust stream including hydrocarbons, CO and particulate matter; and
    the catalytic article of claim 1.

* * * * *